(12) United States Patent
Sprague et al.

(10) Patent No.: US 8,989,337 B2
(45) Date of Patent: Mar. 24, 2015

(54) METHOD AND APPARATUS FOR AN EXPANDING SPLIT BUSHING PIPE PLUG ASSEMBLY

(75) Inventors: Robin D. Sprague, Wilmington, NC (US); Bruce J. Lentner, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 879 days.

(21) Appl. No.: 12/969,860

(22) Filed: Dec. 16, 2010

(65) Prior Publication Data

US 2012/0155599 A1    Jun. 21, 2012

(51) Int. Cl.

| | |
|---|---|
| *G21C 9/00* | (2006.01) |
| *G21C 13/067* | (2006.01) |
| *F16L 55/132* | (2006.01) |
| *G21C 15/25* | (2006.01) |
| *G21C 19/20* | (2006.01) |
| *G21C 17/017* | (2006.01) |

(52) U.S. Cl.
CPC .......... *G21C 13/0675* (2013.01); *G21C 19/207* (2013.01); *G21Y 2002/402* (2013.01); *G21Y 2002/304* (2013.01); *G21Y 2004/501* (2013.01); *G21C 17/017* (2013.01); *G21Y 2004/504* (2013.01); *G21Y 2002/401* (2013.01); *F16L 55/132* (2013.01); *G21C 15/25* (2013.01); *Y02E 30/31* (2013.01)
USPC ....................................................... 376/392

(58) Field of Classification Search
CPC ............... G21C 19/207; G21C 17/017; G21Y 2004/501; G21Y 2004/504; G21Y 2002/304; G21Y 2002/402; G21Y 2002/401
USPC ....................................................... 376/392
See application file for complete search history.

(56) References Cited

U.S. PATENT DOCUMENTS

| | | | | |
|---|---|---|---|---|
| 4,514,097 A | * | 4/1985 | Daly | 384/93 |
| 4,951,974 A | * | 8/1990 | Schabert et al. | 285/39 |
| 5,297,176 A | * | 3/1994 | Altman et al. | 376/364 |
| 2010/0032938 A1 | | 2/2010 | Jensen | |

FOREIGN PATENT DOCUMENTS

| | | |
|---|---|---|
| EP | 1 519 088 A2 | 3/2005 |
| SU | 434200 A1 | 6/1974 |
| SU | 586350 A1 | 12/1977 |

OTHER PUBLICATIONS

Search Report issued in connection with EP Patent Application No. 11192591.3, Mar. 15, 2012.

* cited by examiner

*Primary Examiner* — Frank J McGue
(74) *Attorney, Agent, or Firm* — Harness, Dickey & Pierce, P.L.C.

(57) ABSTRACT

A method and apparatus for securely fastening a pipe collar or a bracket to a riser pipe of a boiling water reactor (BWR) jet pump assembly. A pipe plug assembly includes an angled pipe plug that acts as a wedge to expand a bushing assembly as the pipe plug is drawn into the overall pipe plug assembly. Expansion of the bushing assembly allows a tight tolerance to exist between an outer diameter of the pipe plug and an inner diameter of the collar/bracket and riser pipe. Expansion of the bushing assembly allows a straight hole to be match drilled into the collar/bracket and riser pipe, thereby avoiding a more complicated tapered hole to be drilled into the collar/bracket and riser pipe. An ensuing tight fit between the pipe plug assembly, the collar/bracket and the riser pipe mitigates vibration of components and minimizes leakage to acceptable levels for use in the flooded environment of the annulus region where the jet pump assembly exists in the BWR.

24 Claims, 15 Drawing Sheets

METHOD AND APPARATUS FOR AN EXPANDING SPLIT BUSHING PIPE PLUG ASSEMBLY

BACKGROUND OF THE INVENTION

1. Field of the Invention

Example embodiments relate to an expandable, pipe plug assembly that may be used on a riser pipe of a Boiling Water Reactor (BWR) jet pump assembly. The pipe plug assembly may be used to secure a pipe collar or bracket to the riser pipe for riser pipe repair. The pipe plug assembly includes a pipe plug that acts as a wedge to expand bushing sections to assure a tight fit within a hole that may be match drilled to ensure a uniform hole exists in the riser pipe as well as the collar or bracket that may be fashioned to the riser pipe. A thin shape of the bushing sections and the existence of narrow gaps between bushing sections mitigate leakage to acceptable levels especially in flooded environments such as the annulus region where the riser pipe exists with the Boiling Water Reactor (BWR).

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In the BWR, hollow tubular jet pumps of a jet pump assembly are positioned within the shroud annulus. The jet pump assembly accepts energized water from outside of the reactor recirculation system and provides the required reactor core water flow to the reactor via diffusers. The formation of minute cracks in the riser pipe may sometimes require repair, which may require the fashioning of a collar or bracket to the outer surface of the riser pipe.

Conventionally, fashioning of a collar or bracket to the rounded surface of the riser pipe may cause complications, especially in the case where access to the inside diameter of the riser pipe is unavailable. Specifically, outer surfaces of a plug that may be used to secure the collar or bracket to the circumferential surface of the riser pipe may be out of alignment with holes drilled in the collar, the bracket, or the riser pipe itself, causing vibration and leakage. Additionally, conventional plugs may not provide radial forces (pressure) to ensure a tight fit between a plug and the collar and/or riser pipe holes.

Alternative to the example embodiments described below, tapered holes with tapered plugs have been considered to securely fashion a collar or bracket to the riser pipe. However, lack of control during electrical discharge machining ("EDM") burns may not guarantee tight tolerances in a tapered angle, resulting in a weak connection between a collar and riser pipe, leakage, as well as deformation or cracking of components.

SUMMARY OF INVENTION

Example embodiments provide a method and an apparatus for an expandable pipe plug assembly that may be used on a riser pipe of a Boiling Water Reactor (BWR) jet pump assembly. The pipe plug assembly may be used to secure a collar or bracket to the riser pipe for riser pipe repair. The pipe plug assembly includes an angled pipe plug that acts as a wedge to expand bushing sections to press the bushing sections against an inside diameter of a hole in the collar and the riser pipe. A thin shape of the bushing sections and a slight (minute) angle of the pipe plug allow tight tolerances to exist between the outer diameter of the installed pipe plug assembly and the inner diameter of the collar and riser pipe holes. An ensuing tight fit between the pipe plug assembly, the collar and the riser pipe mitigates vibration between components as well as minimizing leakage to acceptable levels for use in the flooded environment of the annulus where the jet pump assembly exists in the BWR.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
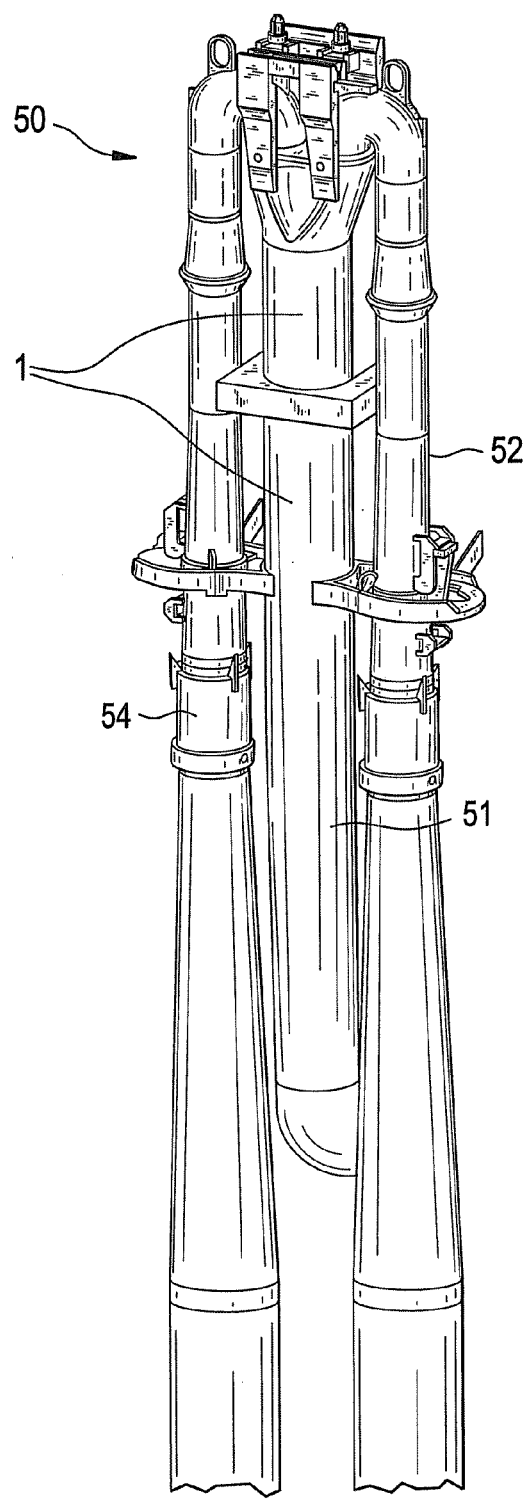
FIG. 1 is a perspective view of a boiling water nuclear reactor (BWR) jet pump assembly with an expandable plug assembly, in accordance with an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular fauns "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a perspective view of a nuclear boiling water reactor (BWR) jet pump assembly 50 located in an annulus between a cylindrical reactor pressure vessel (RPV) and a cylindrical shaped shroud of a BWR. Water entering the riser pipe 51 provides the drive flow (energy) for the jet pump assembly. Energized water enters riser pipe 51 and is distributed into inlet mixers 52 and diffusers 54 before being discharged into the reactor core. The riser pipe 51 is susceptible to minute cracks and therefore repairs may need to be performed on the riser pipe 51 which may include securing a collar or bracket to the riser pipe 51. The repairs may include installing a pipe plug assembly 1 on the riser pipe 51 as shown in FIG. 1.

Figure 2:
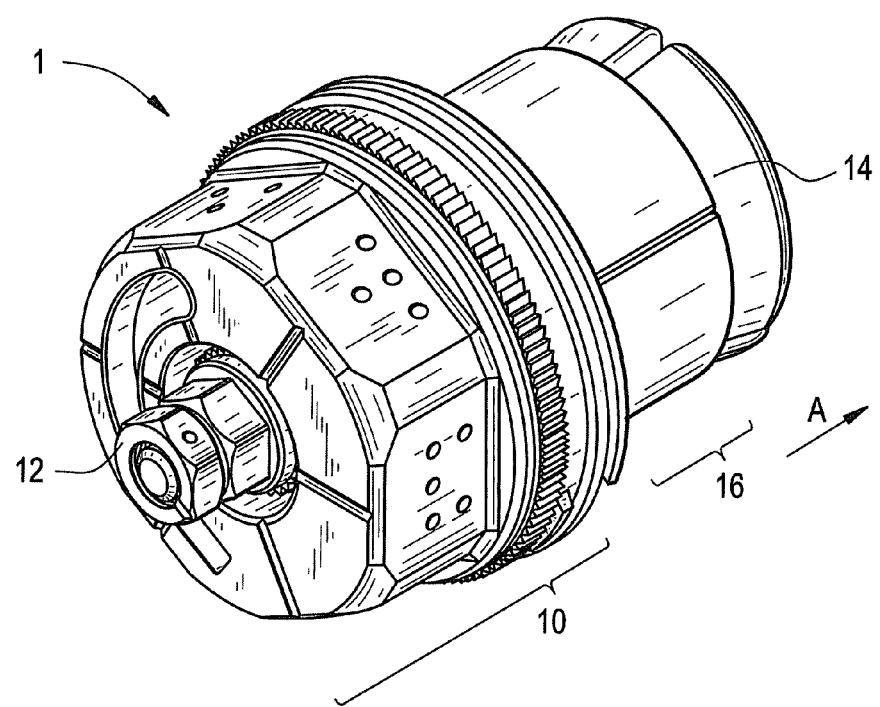
FIG. 2 is a front side-angle perspective view of an expandable pipe plug assembly, in accordance with an example embodiment.

FIG. 2 is a front side-angle perspective view of an expandable pipe plug assembly 1 (as shown installed in FIG. 1), in accordance with an example embodiment. Features of the pipe plug assembly F may include a somewhat spherical electrical discharge machining ("EDM") plug 10 with a ratchet nut 12 which may be located in a recessed front face of the plug 10. The back of the EDM plug 10 may include a pipe plug 14 located inside of an expandable bushing assembly 16. The pipe plug assembly is to be inserted/installed into a hole that may be drilled in the riser pipe 51 of a jet pump assembly 50 (as shown in FIG. 1), by inserting the plug assembly 1 into the riser pipe in the direction A (i.e., the pipe plug 14 end of the pipe plug assembly 1 is inserted into a hole in the riser pipe).

Figure 3:
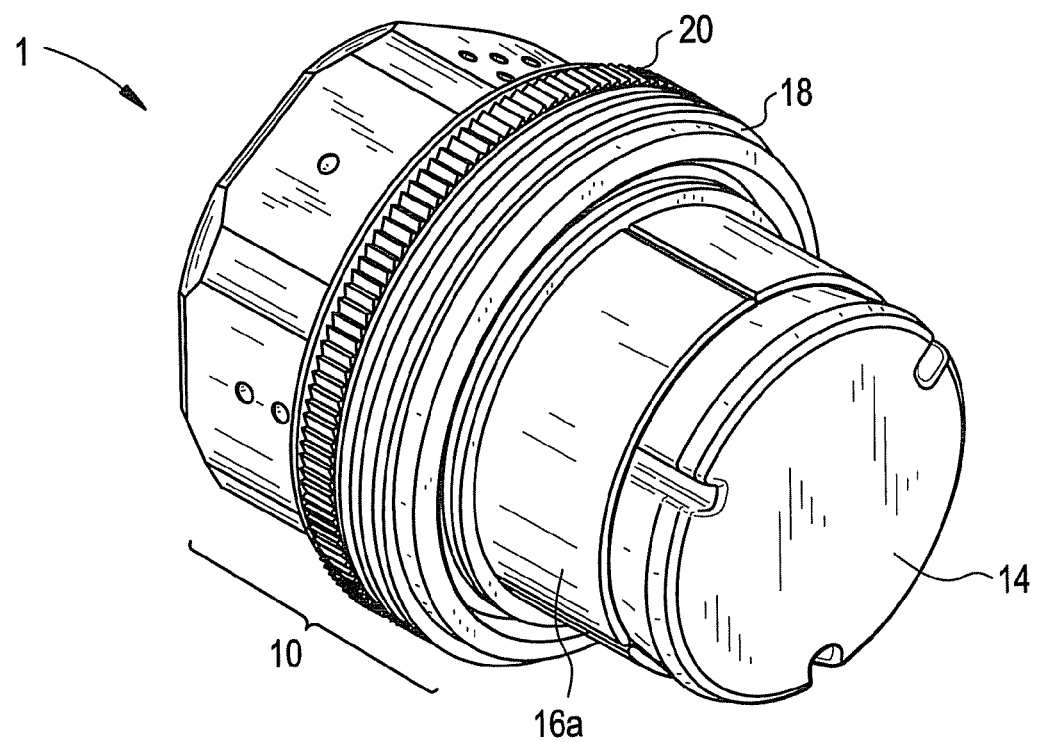
FIG. 3 is a rear side-angle view of an expandable pipe plug assembly, in accordance with an example embodiment.

FIG. 3 is a rear side-angle view of an expandable pipe plug assembly 1, in accordance with an example embodiment. The EDM plug 10 may be a somewhat cylindrical shape with threads 18 provided on an outer circumferential surface of the EDM plug 10. Note that ratchet teeth 20 may also be provided along the circumferential surface of the EDM plug 10 for anti-rotational purposes. A keeper (not shown) may be used to ensure that the EDM plug 10 may not rotate in a counterclockwise direction once the pipe plug assembly 1 is field installed.

Figure 4:
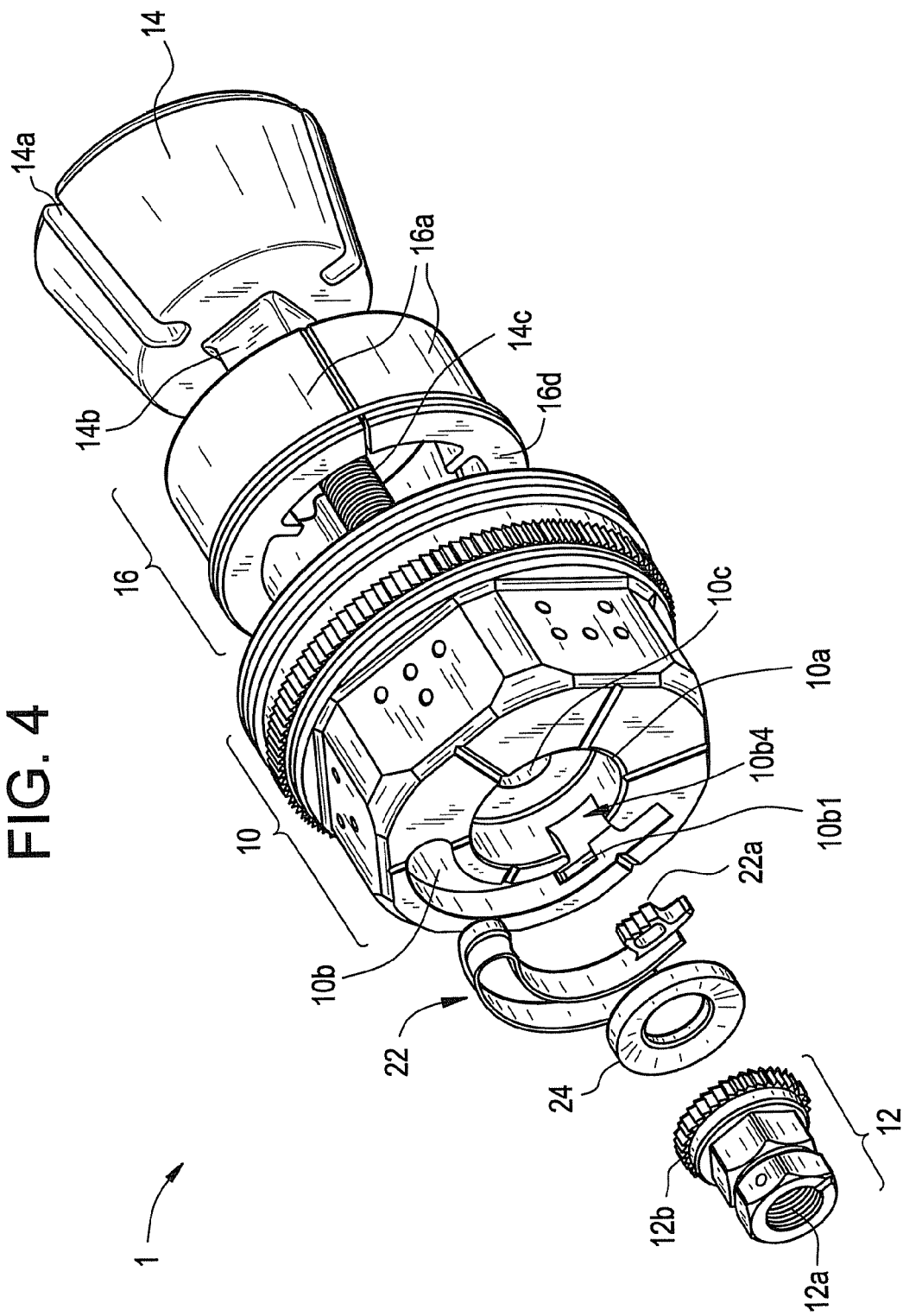
FIG. 4 is a front exploded view of an expandable pipe plug assembly, in accordance with an example embodiment.

FIG. 4 is a front exploded view of an expandable pipe plug assembly 1, in accordance with an example embodiment. Major features in approximate order from left to right include the following. Ratchet nut 12 may include teeth 12b, which may contact keeper teeth 22a of J-shaped keeper 22 for anti-rotation purposes following installation of the pipe plug assembly 1 (i.e., teeth 22a of keeper 22 may be configured to allow ratchet nut 12 to rotate only in a clockwise direction and not in a counterclockwise direction). Ratchet nut threads 12a may be provided to mate with plug bolt 14c, allowing the ratchet nut to be rotated to tighten its hold on plug bolt 14c and pipe plug 14 to draw pipe plug 14 toward EDM plug 10. Washer 24 may be provided within EDM plug recessed center hole 10a. The washer 24 may be a spherical washer with one face that is concave (the face of washer 24 that contacts ratchet nut 12 is concave, as shown in better detail in FIG. 13). The concave face of washer 24 provides a tolerance in the event that plug bolt 14c is not installed at an entirely perpendicular angle with the overall EDM plug 10. Specifically, a spherical bottom surface of ratchet nut 12 (convex spherical surface 12c of ratchet nut 12 is shown for instance in FIG. 12) may allow ratchet nut 12 to pivot as it rides along the spherical surface of washer 24 to provide a tolerance in the event that plug bolt 14c penetrates EDM plug 10 at a somewhat off-center angle (i.e., ratchet nut 12 may pivot in the event of angular misalignment).

Figure 10:
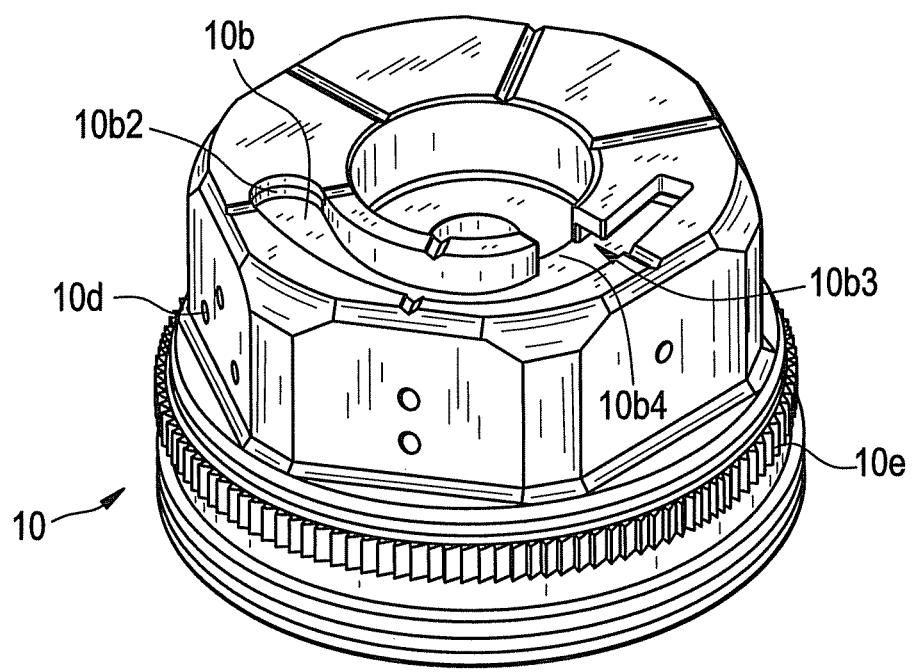
FIG. 10 is a perspective view of an EDM plug assembly of a pipe plug assembly, in accordance with an example embodiment.

EDM plug keeper recess 10b is an approximately "J"-shaped recessed area that contains the approximately "J"-shaped keeper 22. Opening 10b4 is provided in recess 10b to allow keeper teeth 22a to contact ratchet nut teeth 12b for anti-rotation purposes. Note that a first undercut 10b1 is shown in recess 10b. First undercut 10b1 is one of three undercuts (the others are shown in FIG. 10) which provides three points of contact to retain keeper 22 in the keeper recess 10b (specifically, lip 22b1 of keeper 22 shown in FIG. 5 fits into undercut 10b1).

EDM center hole 10c is provided in the center of EDM plug 10 to allow plug bolt 14c to fit through the EDM plug 10. EDM plug recessed center hole 10a is also provided in EDM plug 10 to provide tolerances for ratchet nut 12 to rotate within the center hole 10a even when plug bolt 14c may not intersect EDM plug 10 at a substantially perpendicular angle. Expandable bushing assembly 16 may include separate bushing sections 16a that surround plug 14. Each bushing section 16a may have a longitudinal wall that forms a longitudinal wall section of the overall somewhat cylindrical bushing assembly 16. Bushing sections 16a may be held together by a retaining ring 16b (shown in more detail in FIGS. 8 and 9). Note that each bushing section 16a may include a flat bushing section base 16d that provides a flat contact surface which contacts flat inner EDM plug surface 11b (shown in FIG. 5) when plug 14 is retracted into the overall pipe plug assembly 1 (thereby pressing bushing base section 16d firmly against inner EDM plug inner surface 11b).

Figure 5:
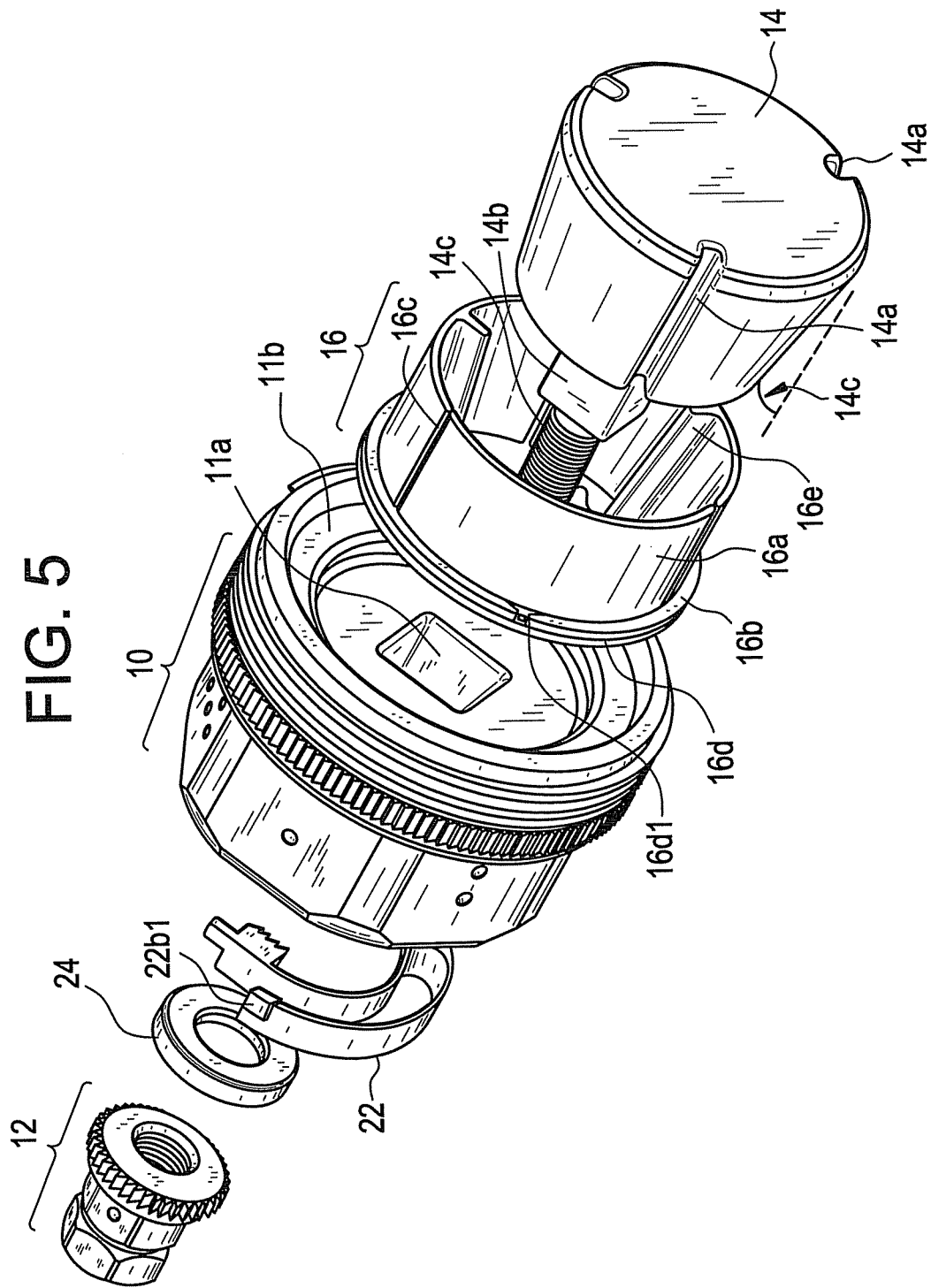
FIG. 5 is a rear exploded view of an expandable pipe plug assembly, in accordance with an example embodiment.
Figure 6:
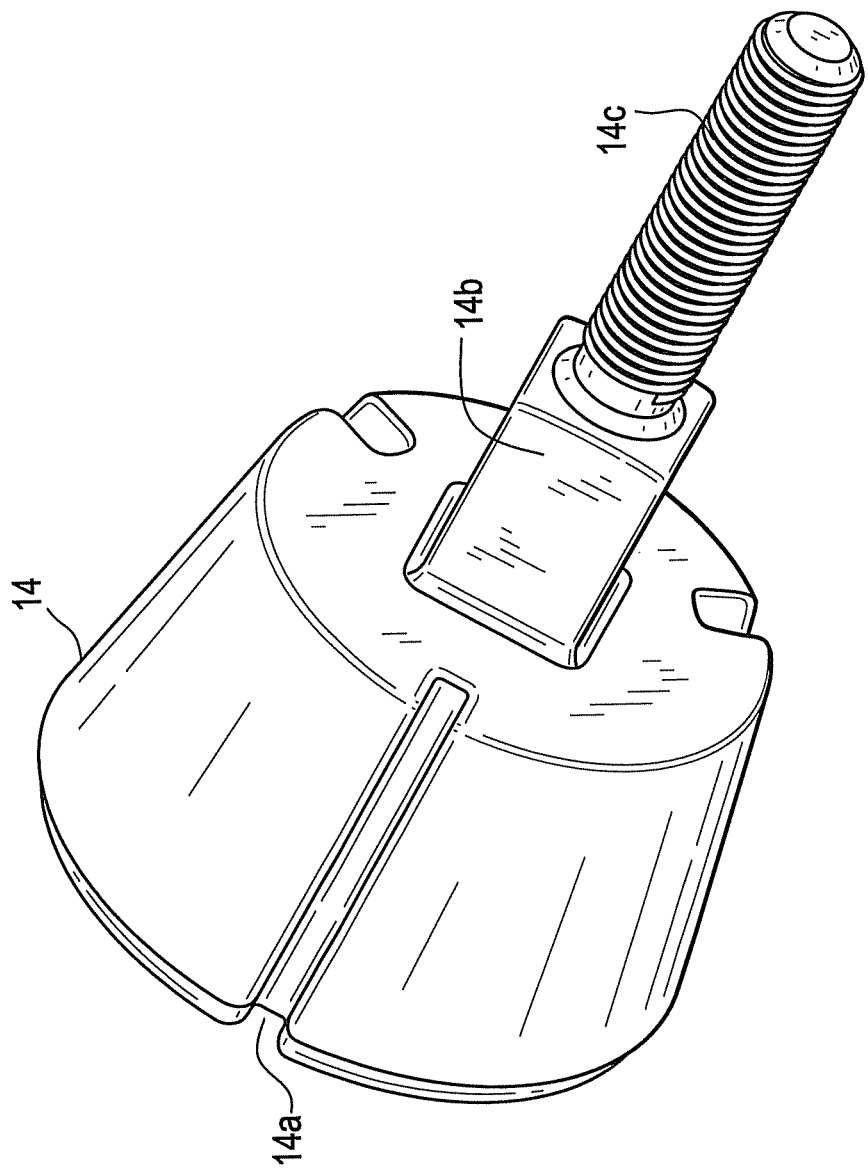
FIG. 6 is a perspective view of a pipe plug of a pipe plug assembly, in accordance with an example embodiment.

Pipe plug 14 may be a conical wedge shape with a square boss 14b that supports plug bolt 14c (shown best in FIG. 6). Note that pipe plug 14 may include alignment channels 14a that may mate with longitudinal alignment bosses 16e (shown in FIG. 5) of bushing sections 16a to allow pipe plug 14 to align with expandable bushing assembly 16 to cause bushing sections 16a to outwardly expand as pipe plug 14 is drawn into the overall pipe plug assembly 1 during field installation.

FIG. 5 is a rear exploded view of an expandable pipe plug assembly 1, in accordance with an example embodiment. Moving generally from left to right across the figure, additional features shown in this drawing include lip 22b1 of keeper 22. Lip 22b1 provides one of three points of contact, which allow keeper 22 to remain in EDM plug keeper recess 10b (lip 22b1 fits into undercut 10b1 shown on FIG. 4).

EDM plug 10 includes a square pocket 11a that allows for insertion of square boss 14b when pipe plug 14 is drawn into EDM plug 10. Flat inner EDM plug surface 11b provides a flat surface for bushing section base 16d to contact, which provides a stopping point for bushing assembly when bushing assembly 16 is drawn toward EDM plug 10 (due to the drawing in of pipe plug 14 via ratchet nut 12).

Bushing assembly 16 is shown with retaining ring 16b holding the separate busing sections 16a together. Boss 16d1, located on only one of the individual sections, provides a means to hold retaining ring 16b in one fixed position while holding the separate bushing sections 16a together (this is shown in more detail and discussed at more length, later in the disclosure and the drawings). Note that three separate busing sections 16a are shown in this embodiment. A gap 16c is located between separate bushing sections 16a. While retaining ring 16b holds the bushing sections 16a together, and prior to insertion of pipe plug inside of bushing assembly 16, the gaps 16c are minimal (approximately 0.00 inches) thereby causing the wall of each bushing section 16a to exist at approximately 90-degree angles with the plane of the retaining ring 16b. It should be noted that alternatively to three separate bushing sections 16a, only one bushing section with one gap may be provided. Also, two or four or more bushing may instead be used. Furthermore, rather than providing bushing sections 16a with gaps 16c running located directly in between the bushing sections 16a, the bushing assembly may instead be made of overlapping bushing sections that provide a tortuous or labyrinth path.

The bushing sections 16a may have alignment bosses 16e running along the inside diameter of the bushing sections 16a. Alignment channels 14a align with the alignment bosses 16e allowing pipe plug 14 to be inserted into bushing assembly 16. The alignment bosses 16e also cause pipe plug 14 to uniformly expand bush assembly 16 as pipe plug 14 is drawn into EDM plug 10 via ratchet nut 12. Pipe plug 14 may be a conical shape that is tapered (i.e., pipe plug 14 may have a slight angle 14c; the angle 14c may be approximately 10-degree, or it may be any other slight angle that causes bushing sections 16a to slightly flare out as pipe plug 14 is drawn into EDM plug 10 during field installation).

FIG. 6 is a perspective view of a pipe plug 14 of a pipe plug assembly 1, in accordance with an example embodiment. As shown more clearly in this figure, square boss 14b and plug bolt 14c may be rigidly connected to pipe plug 14. Plug bolt 14c mates with ratchet nut threads 12a of ratchet nut 12. Square boss 14b is sized to fit into square pocket 11a of EDM plug 10. Materials of construction for these components may be 304SS, 315SS and/or XM-19.

Figure 7:
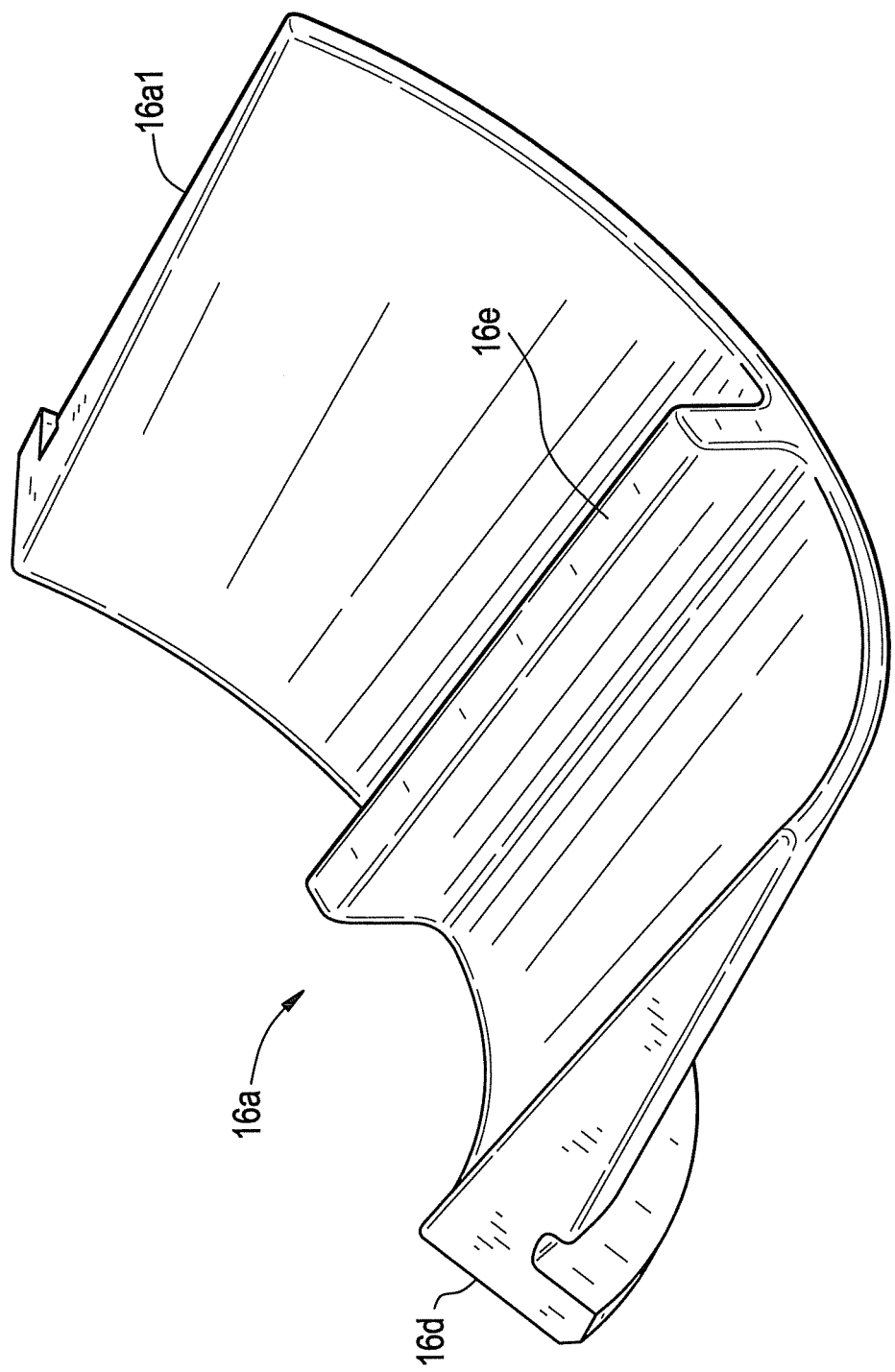
FIG. 7 is a detailed view of a bushing section of a pipe plug assembly, in accordance with an example embodiment.

FIG. 7 is a detailed view of a bushing section 16a of a pipe plug assembly 1, in accordance with an example embodiment. Note that side edge 16a1 is approximately normal (90-degrees) with bushing section base 16d. This causes side edge 16a1 of each bushing section 16a to be held at approximately 90-degrees from the plane of retaining ring 16b (shown for instance in FIG. 9), and it causes gaps 16c (shown for instance in FIG. 5) to be negligible (0.00 inches) when retaining ring 16b is holding the bushing assembly together (and, prior to insertion of pipe plug 14 into bushing assembly 16). Materials of construction for the bushing sections 16a may include 304SS or 316SS.

Figure 8:
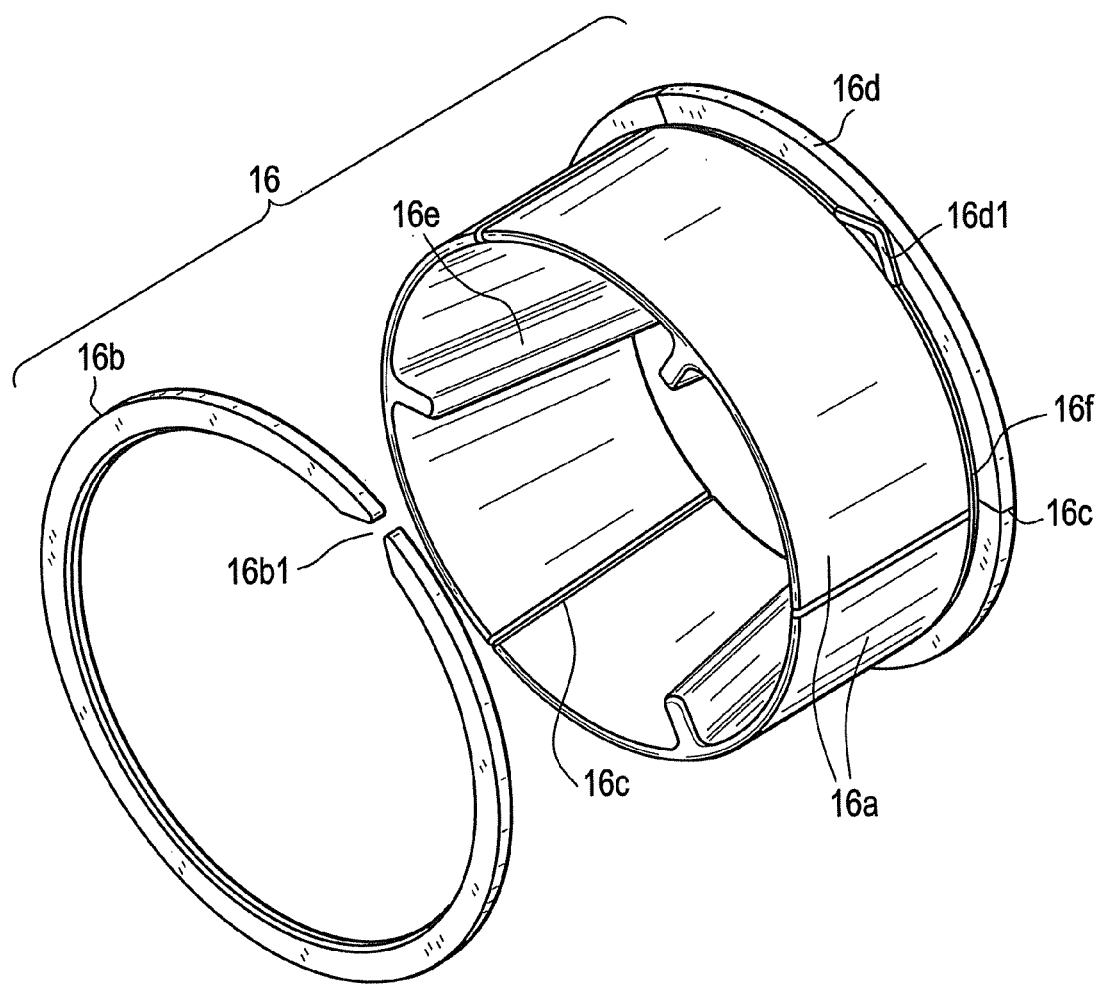
FIG. 8 is a detailed view of a bushing assembly and retaining ring of a pipe plug assembly, in accordance with an example embodiment.

FIG. 8 is a detailed view of a bushing assembly 16 and retaining ring 16b of a pipe plug assembly 1, in accordance with an example embodiment. Bushing assembly 16 may include separate bushing sections 16a that each include a foot or bushing section base 16d. At the seam between the vertical walls of the bushing sections 16a and the base 16d of the bushing sections 16a may be a retaining ring groove 16f that may be used to hold retaining ring 16b in place when retaining ring 16b is used to hold the bushing sections 16a together. Materials of construction for the retaining ring 16b may be X-750.

Three seams 16c separate the three bushing sections 16a. Only one of the bushing sections 16a has a boss 16d1 that ensures that the retaining ring gap 16b1 remains in place (on boss 16d1) when retaining ring 16b is pressed up against the bushing section base 16d. Boss 16d1 ensures that retainer ring 16b does not rotate such that that ring gap 16b1 is relocated to be directly in front of any of one of the gaps 16c, as doing so may provide a flow path of water through plug assembly 1.

Figure 9:
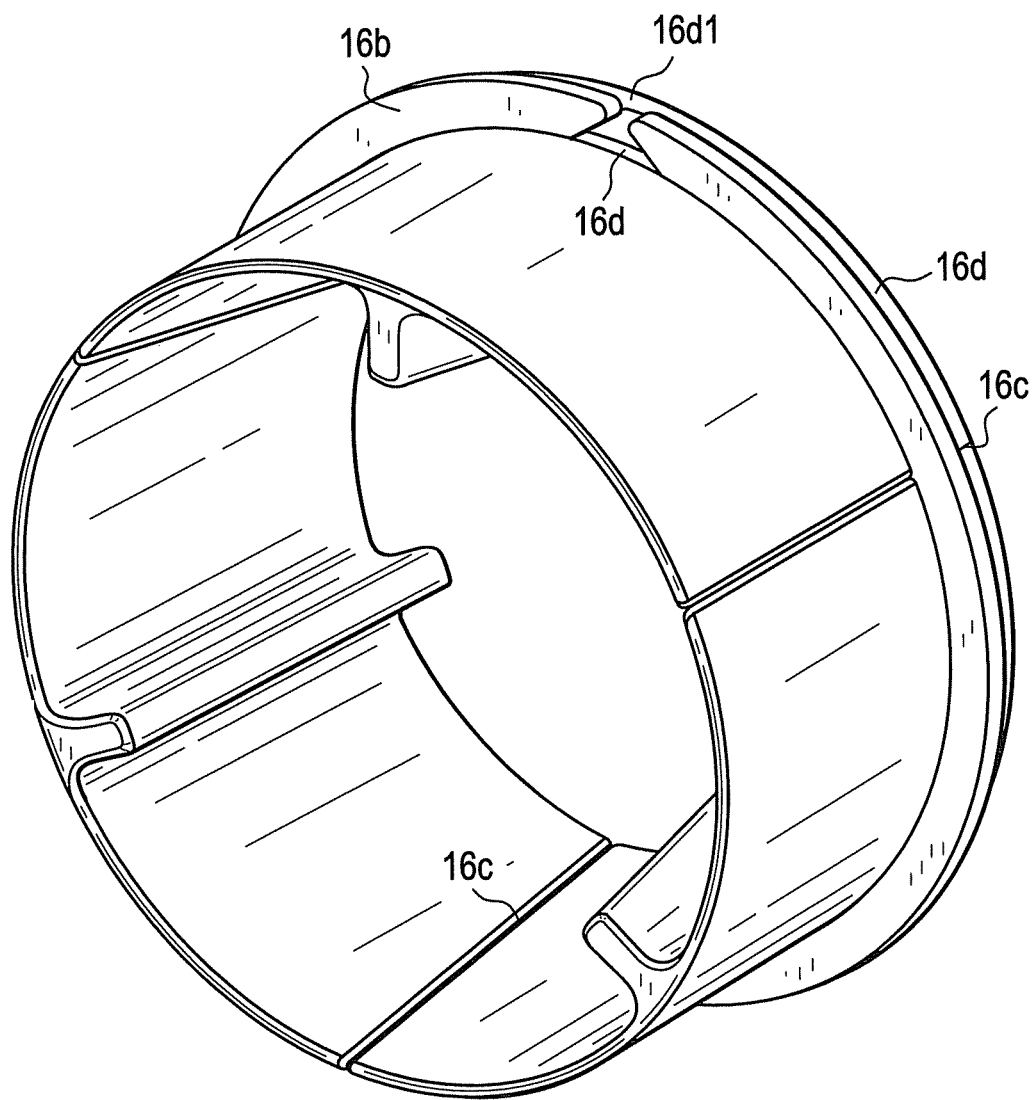
FIG. 9 is a detailed view of a bushing assembly with a retaining ring installed, in accordance with an example embodiment.

FIG. 9 is a detailed view of a bushing assembly 16 with a retaining ring 16b installed, in accordance with an example embodiment. Note that retaining ring 16b is pressed up against bushing section base 16d and ring gap 16b1 is riding boss 16d1 to hold retaining ring 16b in one fixed position. While retaining ring 16b is installed on bushing assembly 16, gaps 16c remain closed (approximately 0.00 inch width).

FIG. 10 is a perspective view of an EDM plug 10 of a pipe plug assembly 1, in accordance with an example embodiment. Keeper recess 10b may include a second undercut 10b2 that provides a second point of contact for keeper 22. Specifically, second undercut 10b2 provides a point of contact for lip 22b2 of keeper 22 (shown in FIG. 11). A third undercut 10b3 may provide a third point of contact for keeper 22, as lip 22b1 (shown in FIG. 11) contacts undercut 10b3 to ensure that keeper 22 remains in keeper recess 10b. Opening 10b4 allows keeper teeth 22a to contact ratchet nut teeth 12b for anti-rotation purposes to ensure ratchet nut 12 may not rotate and become loose after being installed in the field. Materials of construction for EDM plug 10 and its sub-components may be 304SS and/or 316SS.

Dice markings 10d may be provided to record and track the position of the EDM plug assembly 10 while it is installed and being used in the field. This may be used to ensure for instance that EDM plug assembly 10 does not rotate while plug assembly 1 is in field use.

Figure 11:
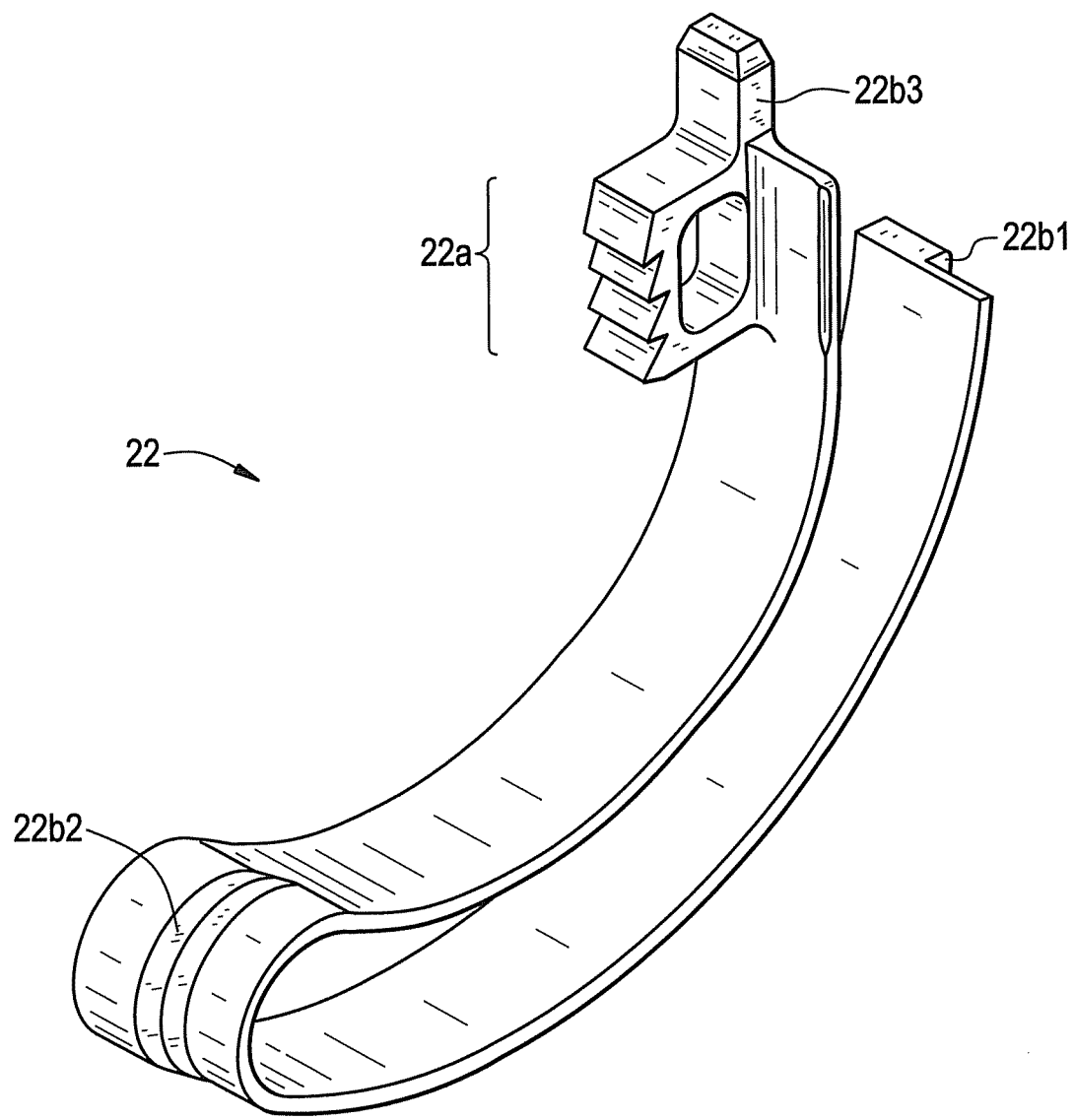
FIG. 11 is a perspective view of a keeper of a pipe plug assembly, in accordance with an example embodiment.

FIG. 11 is a perspective view of a keeper 22 of a pipe plug assembly 1, in accordance with an example embodiment. The keeper 22 may be formed of a resilient material (such as for instance X-750) that causes keeper 22 to act as a spring that may fit into the J-shaped keeper recess 10b of EDM plug 10. Note that three points of contact (lip 22b1, lip 22b2 and tab 22b3) may be provided to mate with undercuts 10b1, 10b2 and 10b3 (shown in FIGS. 4 and 10) to ensure that keeper 22 remains in keeper recess 10b while plug assembly 1 is in use.

Figure 12:
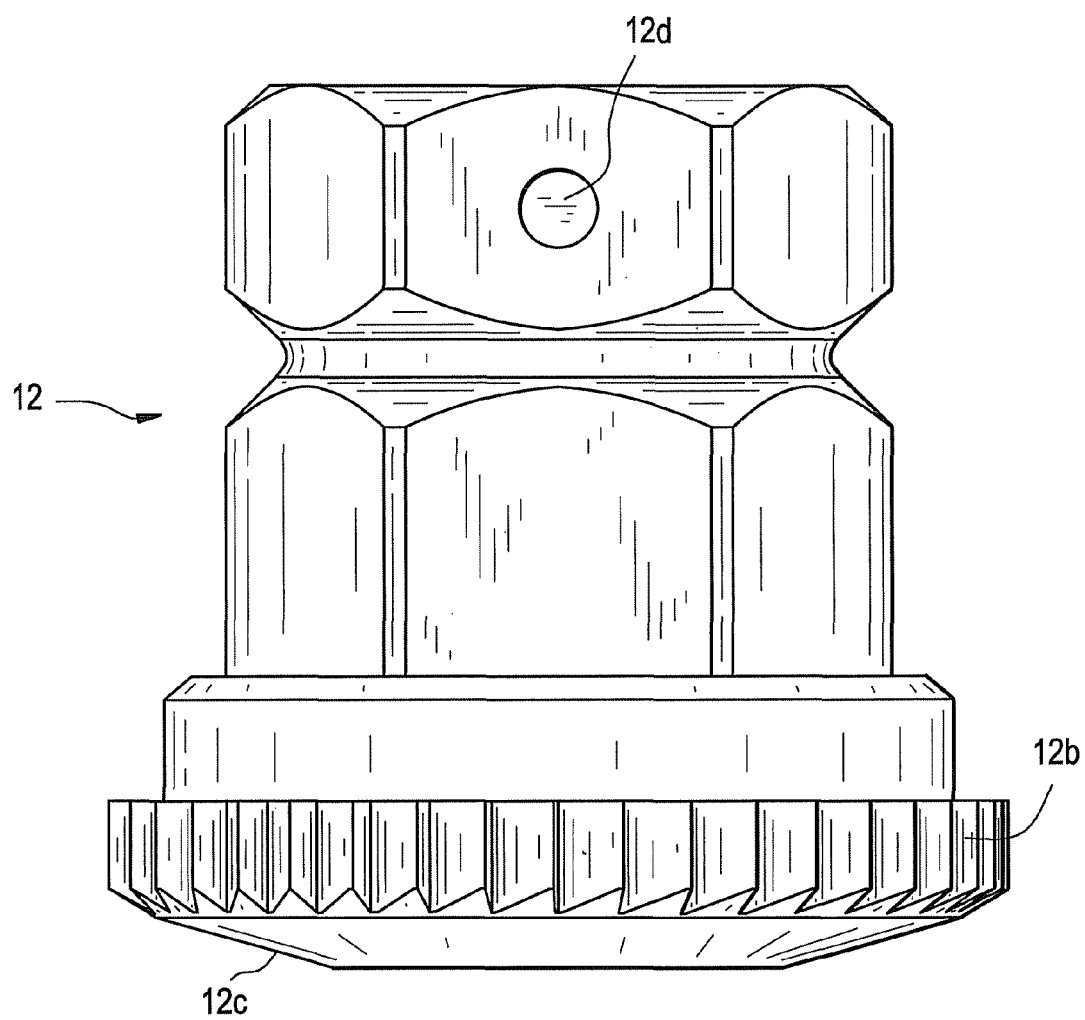
FIG. 12 is a side-view of a ratchet nut of a pipe plug assembly, in accordance with an example embodiment.

FIG. 12 is a side-view of a ratchet nut 12 of a pipe plug assembly 1, in accordance with an example embodiment. Teeth 12b may be provided for ant-rotation purposes by allowing keeper teeth 22a to contact teeth 12b. Note that a spherical, somewhat convex bottom surface 12c may be provided for ratchet nut 12. The convex surface 12c of ratchet nut 12 may mate with a spherical, concave surface of washer 24 to provide a tolerance for the positioning and fit of ratchet nut 12 within the recessed center hole 10a of EDM plug 10 in the event plug bolt 14c is installed such that it is not at an exactly normal (i.e., 90-degree) angle with EDM plug 10 when pipe plug assembly 1 is installed in the field. The mating of the spherical surface 12c of ratchet nut 12 and the spherical surface of washer 24 can be seen in better detail in FIG. 13. Materials of construction for ratchet nut 12 may include 304SS or 316SS.

Figure 13:
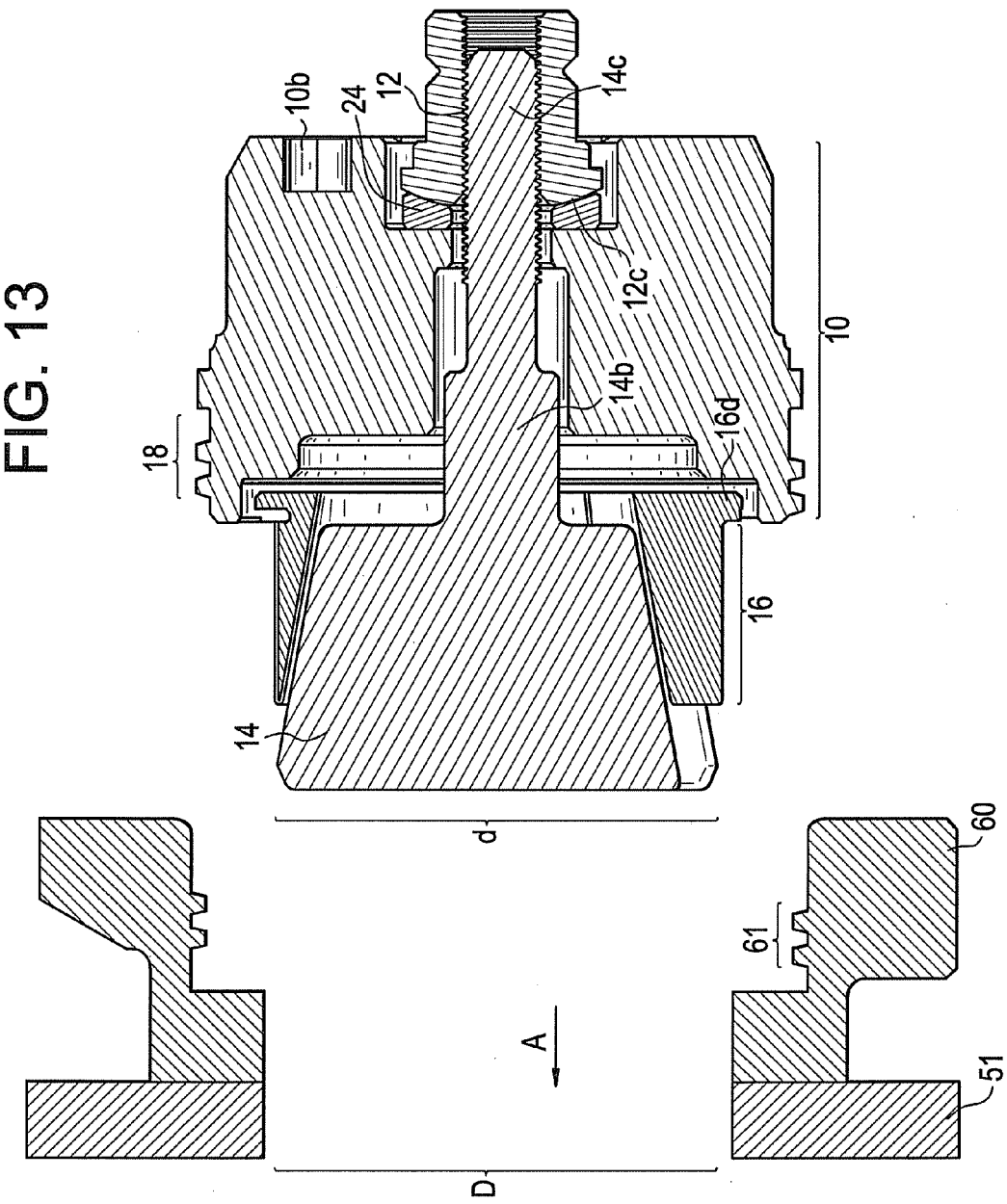
FIG. 13 is a cross-sectional view of a pipe plug assembly (in an initial installation condition) outside of a hole that has been drilled in a collar and riser pipe wall, in accordance with an example embodiment.

FIG. 13 is a cross-sectional view of a pipe plug assembly 1 outside of a hole that has been drilled in a collar 60 and riser pipe wall 51, in accordance with an example embodiment. Pipe plug 1 is shown in an "initial installation condition," as gaps 16c (shown for instance in FIG. 9) in bushing assembly 16 are closed (gaps 16c are approximately 0.00 inches). In this "initial installation condition," diameter d of pipe plug 14 and bushing assembly 16 is smaller than diameter D of the hole in collar 60 and riser pipe wall 51 to allow pipe plug assembly 1 to be inserted into collar 60 and riser pipe 51 in direction A. Note that threads 61 may be machined into collar 60 to mate with threads 18 of the EDM plug 10. The spherical shape of washer 24 and surface 12c of ratchet nut 12 is also shown in more detail in this figure. As described earlier, the spherical shape of washer 24 and surface 12c allow ratchet nut 12 to pivot to provide a tolerance in the event that plug bolt 14c penetrates EDM plug 10 at an off-center angle (i.e., ratchet nut 12 may pivot in the event of angular misalignment). Materials of construction for the spherical washer may be X-750.

Figure 14:
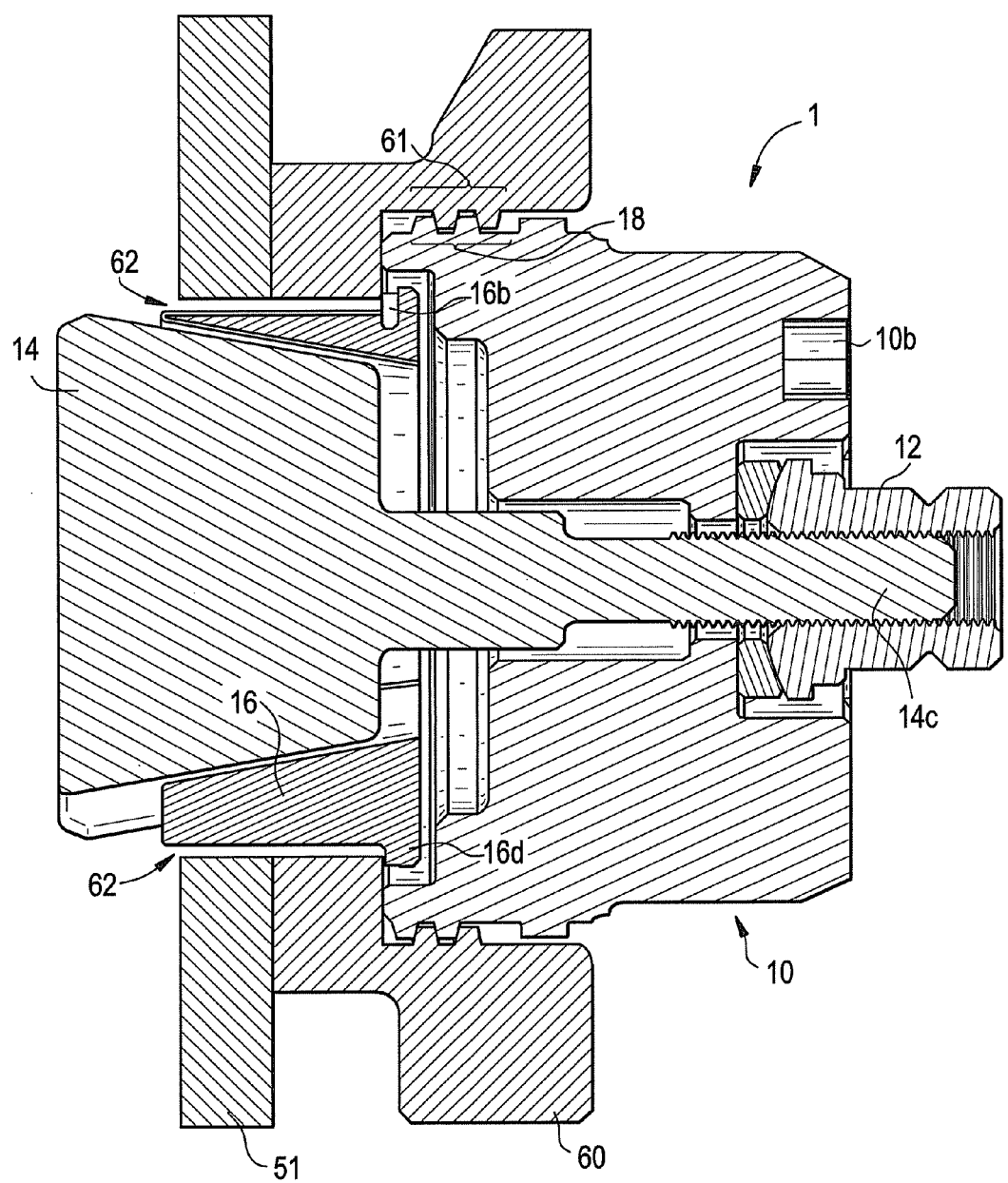
FIG. 14 is a cross-sectional view of a pipe plug assembly (in an initial installation condition) inside of a hole that has been drilled in a collar and riser pipe wall, in accordance with an example embodiment.

FIG. 14 is a cross-sectional view of a pipe plug assembly 1 inside of a hole that has been drilled in a collar 60 and riser pipe wall 51, in accordance with an example embodiment. The pipe plug assembly 1 is still in the "initial installation condition," meaning that gaps 16c (shown for instance in FIG. 9) are still closed (gap is approximately 0.00 inches). This causes gaps 62 to exist between bushing assembly 16 and the inside diameter of collar 60 and riser pipe wall 51. Note that bushing section base 16d may act as a lip to hold bushing assembly 16 in place and against the outer surface of a recessed hole that is provided in collar 60.

Figure 15:
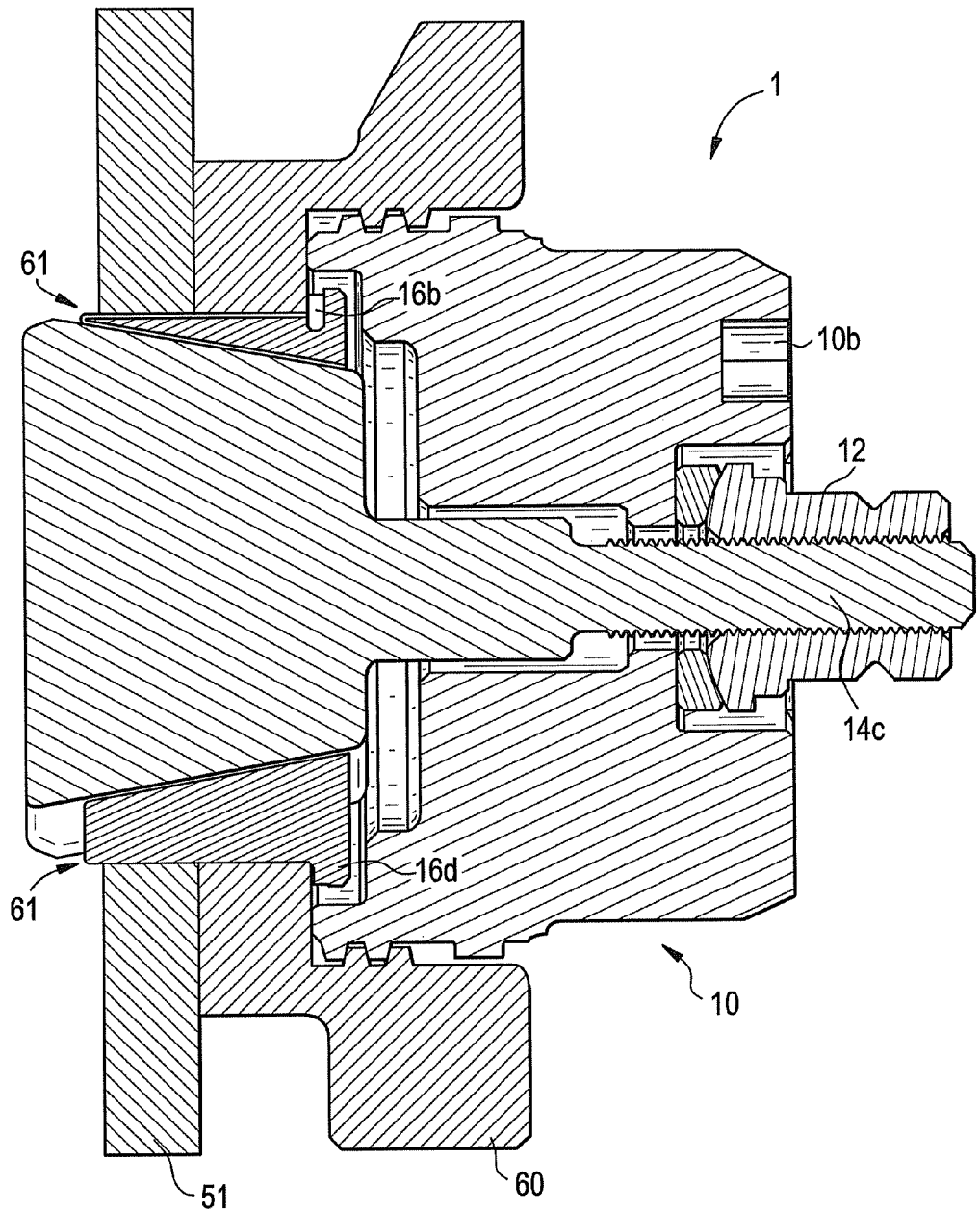
FIG. 15 is a cross-sectional view of a pipe plug assembly (in an installed condition) installed in a hole that has been drilled in a collar and riser pipe wall, in accordance with an example embodiment.

FIG. 15 is a cross-sectional view of a pipe plug assembly 1 installed in a hole that has been drilled in a collar 60 and riser pipe wall 51, in accordance with an example embodiment. Pipe plug assembly 1 is shown in an "installed condition" this time, as gaps 16c (shown for instance in FIG. 9) have been expanded to cause the diameter of bushing assembly 16 to match the diameter of the hole in collar 60 and riser pipe 51. The expansion of the gaps may be for instance approximately 0.1 inches. The expansion of bushing assembly 16 is accomplished through the tightening of ratchet nut 12 which provides axial tension that causes plug bolt 14c to be drawn through EDM plug 10, as pipe plug 14 is drawn into bushing assembly 16. The slight angle of pipe plug 14 outer walls causes the diameter of the bushing assembly 16 to expand, while gaps 16c (shown for instance in FIG. 9) increase in size to allow for the expansion. Once installed, the expandable nature of the bushing assembly 16 of pipe plug assembly 1 may provide radial pressure against the inside diameter of the holes in both collar 60 and riser pipe wall 51. Existence of the pipe plug assembly 1 penetrating both collar 60 and riser pipe wall 51 transfers axial and torsional forces from collar 60 to pipe 51 which may be beneficial during pipe 51 repair.

It should be understood that the plug assembly 1 described above is suited to fashion a collar or bracket onto a spherical surface of a pipe, especially in the case where the collar/bracket and pipe wall are EDM match-drilled. Match drilling allows for multiple layers of material (such as the collar or bracket, and the pipe wall) to be drilled at once. In an example embodiment, match drilling may be accomplished by drilling a straight hole through both the collar/bracket and pipe wall at approximately a normal angle (i.e., a 90-degree angle). During match drilling, the drilling of a straight hole is easier to perform than a tapered hole (which, in turn, would require a tapered wedge to plug the tapered hole). The ability of the bushing assembly 16 of the plug assembly 1 allows the straight hole to be plugged without tapering, ensuring that field installation may be performed more easily and with greater degree of success as a tight fit is provided to reduce vibration of components and potential leakage of fluids from the pipe. The expandability of the plug assembly 1 is particularly useful when only an outer diameter of a pipe (such as a riser pipe of a BWR jet pump assembly) may be accessed, while the inside diameter of the pipe is inaccessible.

While the example embodiments described above relate to a pipe plug assembly that may be used to fashion a collar or a bracket to a circumferential surface of a pipe such as a riser pipe of a BWR jet pump assembly, it should be understood that the pipe plug assembly may also be used simply to plug a hole. Furthermore, the hole need not be on a circumferential surface of a pipe, as it may instead be a hole that has been drilled into a flat wall or surface. Furthermore, while an example embodiment is drawn toward plugging a hole formed via electrical discharge machining (EDM), it should be understood that any other type of machining or drilling may be used to form the hole that may then be plugged using example embodiments.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An expandable pipe plug assembly comprising:
   a main plug with a first end and a second end,
   a ratchet nut on the first end of the main plug,
   a pipe plug on the second end of the main plug, the pipe plug being connected to the ratchet nut via a plug bolt, the ratchet nut configurable to tighten hold of the plug bolt to draw the plug bolt and the pipe plug toward the main plug, and
   an expandable bushing assembly between the main plug and the pipe plug, the expandable bushing assembly having a longitudinal length with a first end facing the pipe plug and a second end facing the main plug, the expandable bushing assembly being configured to radially expand along the longitudinal length such that the first end and the second end are configured to expand as the pipe plug is drawn toward the main plug, the expandable bushing assembly not being permanently affixed to the main plug.

2. The pipe plug assembly of claim 1, wherein the expandable bushing assembly further comprises:

a plurality of separate bushing sections, each bushing section having a longitudinal wall that forms a longitudinal wall section of the expandable bushing assembly, wherein the expandable bushing assembly is cylindrical and includes longitudinal gaps running along the longitudinal length of the expandable bushing assembly and in-between the bushing sections.

3. The pipe plug assembly of claim 2, wherein each bushing section further comprises:

a flat bushing section base existing at approximately a normal angle from the longitudinal wall of the bushing section, each bushing section base forming a flat base section of the expandable bushing assembly, each bushing section base being configured to expand along with the bushing sections as the pipe plug is drawn toward the main plug.

4. The pipe plug assembly of claim 3, wherein the expandable bushing assembly further comprises:

a circular retaining ring configured to hold the bushing sections together, the retaining ring including a gap that mates with a boss located on the base of one of the bushing sections, the boss being configured to ensure that the retaining ring does not rotate while the retaining ring holds the bushing sections together, and a retaining ring groove located between the longitudinal wall and the flat base section of each bushing section, the retaining ring groove being configured to hold the retaining ring in position near the base of the bushing assembly.

5. The pipe plug assembly of claim 3, wherein each bushing section further comprises:

a longitudinal alignment boss protruding from an inner surface of the longitudinal wall of the bushing section.

6. The pipe plug assembly of claim 5, wherein the pipe plug further comprises:

alignment channels longitudinally positioned along an outer surface of the pipe plug, each alignment channel configured to mate with one of the alignment bosses of the bushing sections, wherein the pipe plug is conical in shape with a tapered end facing the main plug, the conical shape of the pipe plug being configured to cause the longitudinal gaps in the bushing assembly to increase in size and the overall diameter of the bushing assembly to expand as the pipe plug is drawn toward the main plug via the ratchet nut.

7. The pipe plug assembly of claim 6, wherein the pipe plug further comprises:

a square boss on the tapered end of the pipe plug and connected to the plug bolt, the square boss being configured to align and mate with a square pocket of the main plug.

8. The pipe plug assembly of claim 7, wherein the main plug further comprises:

a center hole penetrating the center of the main plug, the center hole being configured to allow the plug bolt to penetrate the main plug and connect to the ratchet nut, a recessed center hole on the first end of the main plug to retain the ratchet nut, and a J-shaped keeper recess on the first end of the main plug located near the recessed center hole, the keeper recess being configured to retain a J-shaped anti-rotational keeper.

9. The pipe plug assembly of claim 8, wherein the J-shaped keeper has anti-rotational teeth, the anti-rotational teeth configured to contact teeth on the ratchet nut to ensure that the ratchet nut may only rotate in one direction.

10. The pipe plug assembly of claim 9, wherein the J-shaped keeper recess of the main plug further comprises:

an opening located between the keeper recess and the recessed center hole of the main plug, the opening allowing the anti-rotational teeth of the keeper to contact the teeth of the ratchet nut, and at least three undercuts along the sides of the keeper recess, the undercuts configured to mate with at least three tabs or lips on the keeper to provide three points of contact to ensure that the keeper remains securely fastened in the keeper recess.

11. The pipe plug assembly of claim 8, further comprising:

a spherical washer between the ratchet nut and an inner surface of the recessed center hole of the main plug, the spherical washer having a concave shaped face facing the ratchet nut and configured to mate with a convex shaped bottom surface of the ratchet nut, the mating surfaces of the washer and the ratchet nut allowing the ratchet nut and the plug bolt to pivot as the ratchet nut is tightened to draw the pipe plug toward the main plug.

12. The pipe plug assembly of claim 1, wherein the expandable bushing section includes one bushing section in a cylindrical shape with only one singular longitudinal gap running along the entire longitudinal length of the bushing section.

13. The pipe plug assembly of claim 1, wherein the main plug is cylindrical in shape and further comprises:

threads on an outer circumferential surface of the main plug, and anti-rotational teeth on the outer surface of the main plug.

14. The pipe plug assembly of claim 1, further comprising:

dice markings on an outer surface of the main plug and the ratchet nut

15. A Boiling Water Reactor (BWR) jet pump assembly comprising:

a riser pipe, a circular collar surrounding the riser pipe, and an expandable pipe plug assembly penetrating a straight hole in the collar and the riser pipe, the pipe plug assembly including, a main plug with a first end and a second end, a ratchet nut on the first end of the main plug, a pipe plug on the second end of the main plug and connected to the ratchet nut via a plug bolt, the ratchet nut being configured to be tightened to draw the plug bolt and the pipe plug toward the main plug, an expandable bushing assembly between the main plug and the pipe plug, the expandable bushing assembly having a longitudinal length with a first end facing the pipe plug and a second end facing the main plug, the expandable bushing assembly being configured to radially expand along the longitudinal length as the pipe plug is drawn toward the main plug such that the first end and the second end are configured to expand to fill the hole in the collar and the riser pipe.

16. A method of affixing a circular collar to a riser pipe of a Boiling Water Reactor (BWR) jet pump assembly, the method comprising:

fashioning the circular collar around an outer surface of the riser pipe, drilling a straight hole through the collar and the riser pipe, inserting an expandable pipe plug assembly into the hole, the pipe plug assembly including, an electrical discharge machining (EDM) plug with a first end and a second end, a ratchet nut on the first end of the EDM plug, a pipe plug on the second end of the EDM plug, an expandable bushing assembly between the EDM plug and the pipe plug, connecting the pipe plug to the ratchet nut via a plug bolt, the plug bolt penetrating the EDM plug and having threads that mate with threads provided on the ratchet nut, drawing the pipe plug toward the EDM plug by tightening the ratchet nut on the plug bolt, and expanding the diameter of the bushing assembly as the pipe plug is drawn toward the EDM plug.

17. The method of claim 16, further comprising:

forming the bushing assembly from a plurality of separate bushing sections, each bushing section forming a longitudinal wall section of the bushing assembly, holding the separate bushing sections together via a circular retaining ring, and securing the retaining ring in a fixed position on the bushing assembly via a retaining ring gap, the retaining ring gap fitting over a boss located on the bushing assembly.

18. The method of claim 16, further comprising:

aligning the pipe plug with the bushing assembly by mating alignment channels on an outer surface of the pipe plug with longitudinal alignment bosses on an inner surface of the bushing assembly.

19. The method of claim 17, further comprising:

forming the pipe plug to be conical in shape with a tapered end facing the EDM plug, the expanding of the diameter of the bushing occurring due to the conical outer surface of the pipe plug pressing against the inner surface of the bushing assembly, causing gaps between the separate bushing sections to expand, as the pipe plug is drawn toward the EDM plug.

20. The method of claim 19, further comprising:

affixing a square boss onto the tapered end of the pipe plug, and aligning the square boss with a square pocket of the EDM plug, allowing the square boss to mate with the square pocket as the pipe plug is drawn toward the EDM plug.

21. The method of claim 16, further comprising:

forming a recessed center hole on the first end of the EDM plug to retain the ratchet nut in the center hole, forming a J-shaped keeper recess on the first end of the EDM plug and located near the center hole, placing a J-shaped keeper with anti-rotational teeth in the J-shaped keeper recess, retaining the J-shaped keeper in the J-shaped keeper recess via three points of contact that are provided between the J-shaped keeper and the J-shaped keeper recess, and allowing the ant-rotational teeth of the J-shaped keeper to contact teeth on an outer surface of the ratchet nut to ensure that the ratchet nut may only rotate in one direction.

22. The method of claim 21, further comprising:

providing a spherical washer between the ratchet nut and an inner surface of the recessed center hole of the EDM plug, a face of the spherical washer facing the ratchet nut having a concave shape, forming a bottom surface of the ratchet nut into a convex shape, and mating the concave face of the spherical washer with the convex bottom surface of the ratchet nut to allow the ratchet nut and the plug bolt to pivot as the ratchet not is tightened.

23. The method of claim 16, further comprising:

forming the EDM plug into a cylindrical shape, providing threads on an outer circumferential surface of the EDM plug, machining threads into the hole in the collar, and screwing the threads of the EDM plug into the threads of the collar to ensure the EDM plug is securely fastened to the collar.

24. An expandable pipe plug assembly comprising:

a main plug with a first end and a second end, a ratchet nut on the first end of the main plug, a pipe plug on the second end of the main plug, the pipe plug being connected to the ratchet nut via a plug bolt, the ratchet nut configurable to tighten hold of the plug bolt to draw the plug bolt and the pipe plug toward the main plug, and an expandable bushing assembly being configured to float between the main plug and the pipe plug, the expandable bushing assembly having a longitudinal length with a first end facing the pipe plug and a second end facing the main plug, the expandable bushing assembly being configured to radially expand along the longitudinal length such that the first end and the second end are configured to expand as the pipe plug is drawn toward the main plug.

* * * * *